April 3, 1962  W. H. DEVONSHIRE  3,028,455
CONVEYOR TRACTOR
Filed March 9, 1960  2 Sheets-Sheet 1
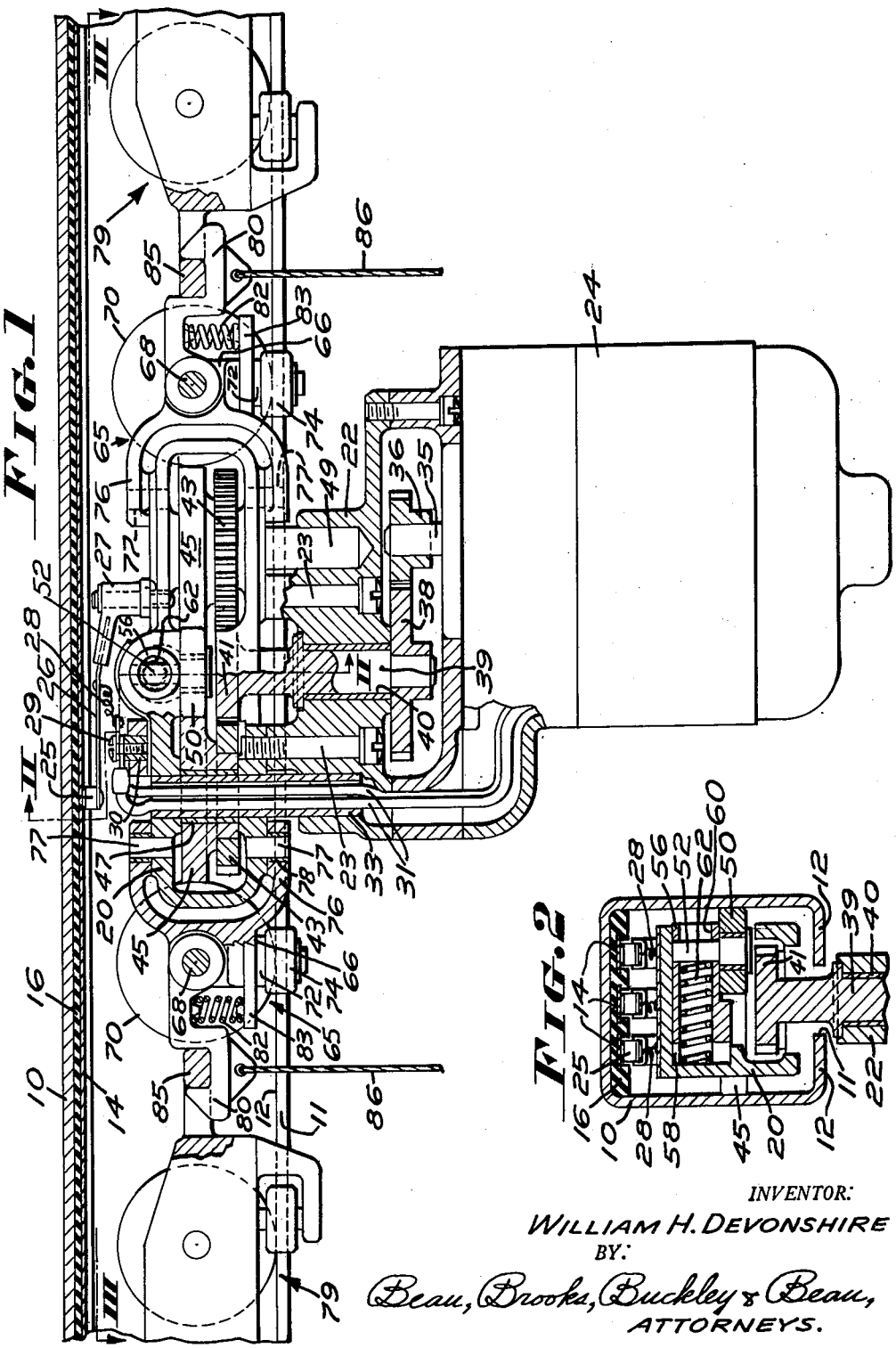
INVENTOR:
WILLIAM H. DEVONSHIRE
BY:
Beau, Brooks, Buckley & Beau,
ATTORNEYS.

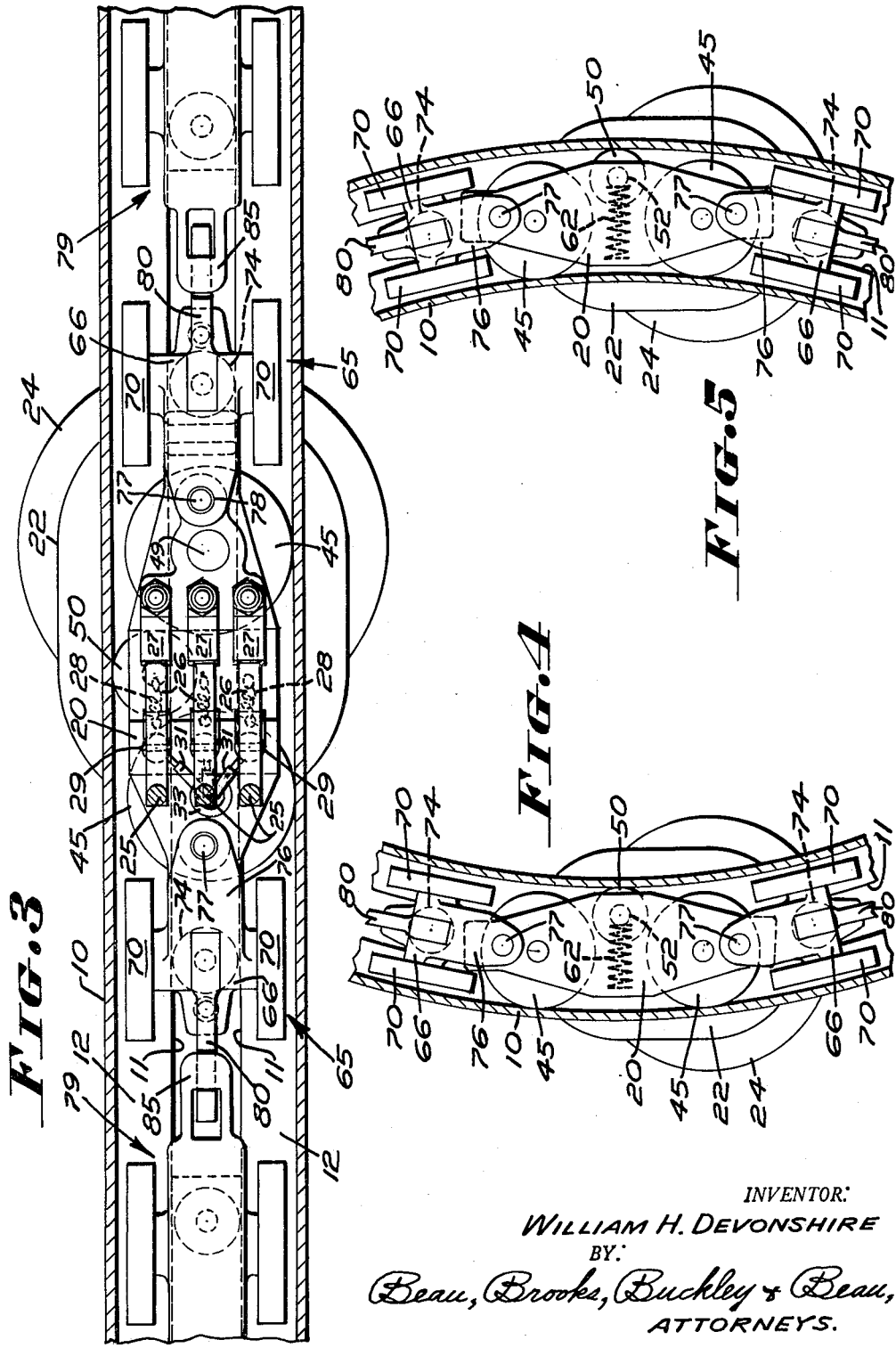

United States Patent Office 3,028,455
Patented Apr. 3, 1962

3,028,455
CONVEYOR TRACTOR
William H. Devonshire, Williamsville, N.Y., assignor to Columbus McKinnon Corporation, Tonawanda, N.Y.
Filed Mar. 9, 1960, Ser. No. 13,953
10 Claims. (Cl. 191—23)

This invention relates to trolley conveyor systems, and more particularly to an improved self-propelling tractor unit for use with conveyor systems wherein the trolleys and tractor unit are arranged to run in a slotted box-sectioned conveyor trackway wherein the tractor unit is arranged to draw its electrical operating power from conductors provided in the trackway.

Another object of the invention is to provide an improved tractor drive unit as aforesaid which is extremely compact in construction and mechanically simple and durable and lighter in weight than known devices.

Another object of the invention is to provide an improved tractor drive unit for the purposes aforesaid which embodies improved drive and guide means.

Another object of the invention is to provide an improved tractor unit as aforesaid which will negotiate sharp turns with improved facility.

Other objects and advantages of the invention will appear from the detailed description hereinbelow and the accompanying drawings wherein:

FIG. 1 is a vertical sectional view of a bottom-slotted, trackway mounting a conveyor tractor unit of the invention, the tractor unit being shown partly inside elevation and partly in section;

FIG. 2 is a cross sectional view taken on line II—II of FIG. 1;

FIG. 3 is a horizontal sectional view taken on line III—III of FIG. 1; and

FIGS. 4 and 5 correspond to FIG. 3 but show, on reduced scale, the power unit negotiating oppositely curved sections of the trackway.

Referring now to the drawings, the tractor unit of the invention is illustrated as being mounted in an overhead trackway conduit 10 which is box-sectioned, as best seen in FIG. 2 and has its bottom wall longitudinally slotted as indicated at 11, margined by a pair of roller support rail portions 12, 12. The form of tractor unit of the invention shown and described herein includes an electric drive motor and the power supply therefor is provided by conductor strips 14, mounted on insulation 16, which is fixed to the upper inside wall of the trackway conduit, as shown.

The tractor unit of the invention includes a running gear housing 20 which is dimensioned and shaped to travel freely within the conveyor guideway 10. A drive train housing 22 is fixed to the housing 20 as by the machine screws 23, and is dimensioned at its upper portion to extend through the trackway slot between the rail portions 12, 12. A motor housing 24 is bolted to the lower side of the drive-train housing 22 and is thus carried outside of and suspended below the trackway 10.

An electric motor (not shown) is carried in the housing 24 and current is supplied thereto from the trackway mounted conductor strips 14 by means of brush contacts 25. The contacts 25 are carried by conductor springs 26 which are mounted atop the running gear housing 20 by means of mounting brackets 27. Lead wires 28 take the current from the conductor springs 26 to terminal screws 29 which thread into insulating bushings 30. Power supply wires 31 from the motor are run through a hollow shaft 33, which extends through alined bores in the housings 20—22 as shown, and are attached to the respective terminal screws 29.

The motor drive shaft 35 carries a pinion 36 which meshes with a gear 38 keyed to a drive shaft 39 carried by bearing 40 in the housing 22. The upper end of the shaft 39 extends into the running gear housing 20 centrally thereof and carries a driving pinion 41 at its upper end.

Meshing with the drive pinion 41, at opposite sides thereof, are a pair of final drive gear and wheel assemblies, each comprising a gear 43 keyed to a hub portion of a drive wheel 45. The left hand (as viewed in FIG. 1) final drive gear and wheel assembly is rotatably mounted on the hollow shaft 33 by means of a bearing sleeve 47 and the other gear and drive-wheel assembly is similarly mounted on shaft 49. The shafts 33, 49 are offsets from the longitudinal center line of the housing 20 so that the drive wheels 45, 45 will contact only one of the side walls of the trackway in friction bearing relation while the running gear housing 20 is centered therein. Positive driving contact of the drive wheels 45, 45 with the side wall of the trackway 10 is maintained by a pressure roller 50 which is carried by the housing 20 and spring loaded to bear against the opposite side wall of the trackway 10.

As best seen in FIG. 2, the roller 50 is rotatably mounted on a headed shaft 52. The shaft is carried by a sliding thimble 56 adapted to slide within bore 58 provided in the housing 20. The thimble 56 is longitudinally bored as indicated at 60 so that a compression spring 62 may be carried therein. One end of the spring 62 bears against the shaft 52 and the other end bears against the end wall of the bore 58 as shown so that the shaft 52 and roller 50 are biased transversely, outwardly from the housing 20.

Wheeled carriages 65 which vertically support the tractor unit for travel on the rails 12 of the trackway 10 are mounted at each end of the housing 20. Each carriage 65 comprises a body portion 66 carrying horizontally a transverse axle 68 which mounts a pair of running wheels 70 as shown. A stub axle portion 72 depends centrally of the body 66 and carries a horizontally disposed guide wheel 74 which is arranged to run in the trackway slot 11 and thereby acts to keep the carriage 65 centered in the trackway. A vertically oriented yoke 76 extends from the carriage body 66 and is adapted to be pivotally connected to the housing 20 by means of vertical pins 77, 77 mounted in bushings 78.

Means for detachable connection of the tractor unit to load trolleys such as indicated at 79 is provided by a dog 80 which is pivotally mounted on the central portion of the horizontal axle 68. A compression spring 82 carried on support portion 83 on body portion 66, biases the dog 80 upwardly in trolley engaging position as shown in FIG. 1. As shown therein, the trolleys 79 terminate in eye portion 85 into which the dogs 80 engage. Pull cords indicated at 86 are provided as a convenient means for manually detaching the tractor unit from the load trolleys.

The construction of the tractor unit of the invention, and particularly the arrangement of the supporting and driving wheels thereof, provide an exceptionally efficient and flexible power unit. As illustrated in FIGS. 4 and 5, the pivot connection of the supporting wheels 70 to the drive wheel carrying housing 20 acts to minimize displacement of the housings 20 and 22 from the centerline of the trackway when the tractor unit is negotiating curved portions of the trackway, and therefor avoids rubbing contact of the housing 22 with the sides of the slotway 11 and as previously explained, the resiliently mounted pressure wheel 50 serves to maintain the drive wheels 45, 45 in firm engagement with the trackway side-wall at all times.

Thus a superior tractor unit, efficient in function and compact in size, uniquely adapted for operation in slotted conduit conveyor trackways is provided, and while only one specific design has been described and illustrated it will be appreciated that certain modifications and changes may be made therein without departing from the spirit of the invention or the scope of the accompanying claims.

I claim:

1. A tractor power unit for operation in overhead conveying systems utilizing a longitudinally slotted conduit as the conveyor trackway, said unit comprising, a drive wheel housing adapted to freely fit and travel within said conduit, wheel means attached to said housing and adapted to run in a conduit-type trackway to rollingly support said unit, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, a motor mounted on said bracket externally of said conduit, and drive transmitting means journalled upon said bracket and interconnecting the output shaft of said motor and said drive wheel means.

2. A tractor power unit for operation in overhead conveying systems utilizing a longitudinally slotted conduit as the conveyor trackway, said unit comprising, a drive wheel housing adapted to freely fit and travel within said conduit, support wheel carriages mounted by vertical pivot connection means at each end of said wheel housing, support wheels journalled on each of said carriages and guide wheels journalled thereon to run in the conduit slot, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, a motor mounted on said bracket externally of said conduit, and drive transmitting means journalled upon said bracket and interconnecting the output shaft of said motor and said drive wheel means.

3. A tractor power unit for operation in overhead conveying systems utilizing a longitudinally slotted conduit as the conveyor trackway, said unit comprising, a drive wheel housing adapted to freely fit and travel within said conduit, support wheel carriages mounted by vertical pivot connection means at each end of said wheel housing, support wheels journalled on each of said carriages and guide wheels journalled thereon to run in the conduit slot, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, an electric motor mounted on said bracket externally of said conduit, drive transmitting means journalled upon said bracket and interconnecting the output shaft of said motor and said drive wheel means, electrical conductors mounted in and running lengthwise of said conduit, electrical contact means mounted on said housing to electrically connect with said conductors and conductor means interconnecting said contact means and said motor.

4. A tractor power unit for operation in overhead conveying systems utilizing a longitudinally slotted conduit as the conveyor trackway, said unit comprising, a drive wheel housing adapted to freely fit and travel within said conduit, support wheels mounted upon said wheel housing and guide wheels journalled thereon to run in the conduit slot, horizontally oriented drive wheel means journalled on said housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, a motor mounted on said bracket externally of said conduit, drive transmitting means journalled upon said bracket and interconnecting the output shaft of said motor and said drive wheel means.

5. A tractor power unit for operation in overhead conveying systems utilizing a longitudinally slotted conduit as the conveyor trackway, said unit comprising, a drive wheel housing adapted to freely fit and travel within said conduit, support wheel carriages mounted by vertical pivot connection means at each end of said wheel housing and each carrying an axle, support wheels journalled on said axles and guide wheels journalled on said carriages to run in the conduit slot, means for coupling the power unit to adjacent components of the conveyor system comprising latch devices pivotally mounted on said axles, spring means biasing said latch devices toward coupling positions, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, a motor mounted on said bracket externally of said conduit, and drive transmitting means journalled upon said bracket and interconnecting the output shaft of said motor and said drive wheel means.

6. A tractor power unit for operation in overhead conveying systems utilizing a longitudinally slotted conduit as the conveyor trackway, said unit comprising, a drive wheel housing adapted to freely fit and travel within said conduit, support wheel carriages mounted by vertical pivot connection means at each end of said wheel housing, support wheels journalled on each of said carriages and guide wheels journalled thereon to run in the conduit slot, means for coupling the power unit to adjacent components of the conveyor system comprising latch devices pivotally mounted on said carriages, spring means biasing said latch devices toward coupling positions, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, a motor mounted on said bracket externally of said conduit, and drive transmitting means journalled upon said bracket and interconnecting the output shaft of said motor and said drive wheel means.

7. A tractor power unit for operation in overhead conveying systems utilizing a longitudinally slotted conduit as the conveyor trackway, said unit comprising, a drive wheel housing adapted to freely fit and travel within said conduit, support wheel carriages mounted by vertical pivot connection means at each end of said wheel housing, support wheels journalled on each of said carriages and guide wheels journalled thereon to run in the conduit slot, means for coupling the power unit to adjacent components of the conveyor system comprising latch devices pivotally mounted on said carriages, spring means biasing said latch devices toward coupling positions, horizontally oriented drive wheel means journalled on said housing at positions offset from the plan view center line of said wheel housing and adapted to bear in traction driving relation against one side wall portion of said conduit, idler wheel means movably mounted on said wheel housing, means biasing said idler wheel means to displace it to pressure-bear against a side wall portion of said conduit opposed to the bearing position of said drive wheel means, a bracket extending from said wheel housing through the slot in said conduit, an electric motor mounted on said bracket externally of said conduit, drive transmitting means journalled upon said bracket and interconnecting the output shaft of said motor and said drive wheel means, electrical conductors mounted in and running lengthwise of said conduit, electrical contact means mounted on said housing to electrically connect with said conductors and conductor means interconnecting said contact means and said motor.

8. A tractor power unit for operation in overhead conveying systems utilizing a longitudinally slotted conduit as the conveyor trackway, comprising a housing dimensioned to travel within said conduit, support wheels mounted on said housing, a pair of drive wheels rotatably mounted in said housing in longitudinally spaced relation to each other, said drive wheels being horizontally disposed and projecting laterally from one side of said housing to engage and bear in traction driving relation against one side wall of the conduit, power means carried by said housing and drivingly connected to said drive wheels, and means biasing said housing within the conduit to maintain said drive wheels in their stated traction driving relation.

9. The tractor power unit according to claim 8 wherein the last means comprises idler wheel means movably carried by said housing and projecting laterally from the side thereof opposite said drive wheels to bear against the opposite side wall of the conduit, and spring means biasing said idler wheel means to displace it to pressure-bear against said opposite side wall of the conduit.

10. A tractor power unit for operation in overhead conveying systems utilizing a longitudinally slotted conduit as the conveyor trackway, said unit comprising, a drive wheel housing adapted to freely fit and travel within said conduit, wheel means attached to said housing and adapted to run in a conduit-type trackway to rollingly support said unit, horizontally oriented drive wheel means journaled on said housing and projecting laterally therefrom to bear in traction driving relation against one side wall portion of said conduit, idler wheel means movably mounted on said wheel housing and projecting laterally from one side thereof, means biasing said idler wheel means to pressure-bear against a side wall portion of said conduit opposed to the bearing position of said drive wheel means, a motor connected to said drive wheel housing externally of said conduit, and drive transmitting means interconnecting said motor and said drive wheel means.

References Cited in the file of this patent
UNITED STATES PATENTS

| | | |
|---|---|---|
| 2,245,135 | Martin | June 10, 1941 |
| 2,282,985 | Schroeder | May 12, 1942 |
| 2,394,168 | Goga | Feb. 5, 1946 |
| 2,479,995 | Barriger | Aug. 23, 1949 |